Feb. 9, 1937. W. KANGAS 2,070,434
ANTIGLARE VISOR FOR REAR VIEW MIRRORS
Filed April 11, 1935
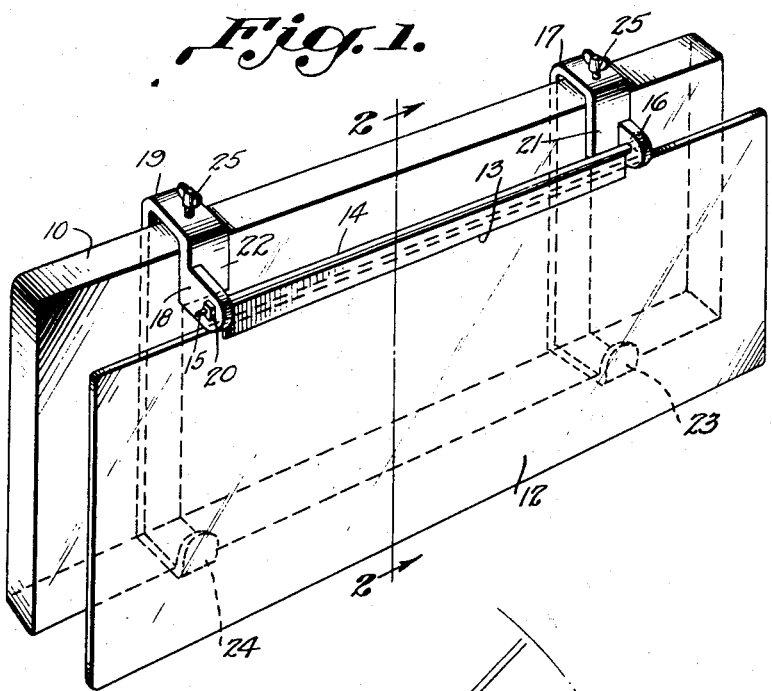
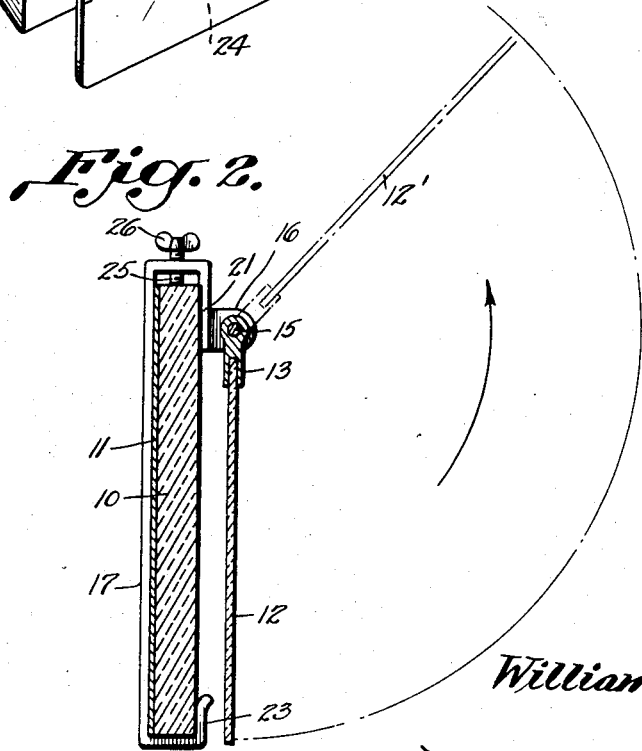
Inventor
William Kangas
By Miller & Miller
Attorneys

UNITED STATES PATENT OFFICE 2,070,434

ANTIGLARE VISOR FOR REAR VIEW MIRRORS

William Kangas, Hibbing, Minn.

Application April 11, 1935, Serial No. 15,867

1 Claim. (Cl. 88—77)

This invention relates to an anti-glare visor for a rear view mirror and has for an object to provide an improved colored transparent visor which may be attached to any existing rear view mirror and then may be swung into and out of operative position whenever desired.

Rear view mirrors as are now used are often made of colored glass so as to eliminate the glare of headlights shining through the rear window of the automobile while in use. The colored glass so used is generally a compromise in that if it is too dark the mirror will be less effective for use during the day time, while if it is not dark enough it will be less effective as an anti-glare mirror for use at night time. This invention has for an object the overcoming of these defects, in that it permits the use of a rear view mirror which is sufficiently colorless so as to be satisfactory for day time use and which when used at night as a result of this invention has sufficient coloring interposed between the mirror and the glaring rays of light that may strike it to prevent any glare from the mirror and allow the mirror to be used satisfactorily in the night time. This added color matter instead of being placed in the mirror is placed in a transparent visor which is to be attached to the mirror by a bracket forming part of this invention, whereby the visor of this invention may be attached to any conventional rear view mirror and then when in attached position the visor itself may be placed in inoperative position during the day time and in the operative position during the night time.

As a further object of this invention the brackets of this invention can be attached to the conventional rear view mirror without the necessity of using any tools which is a decided advantage due to the inaccessibility and inconvenience of using tools on a rear view mirror in its operative position, usually high over the windshield of the automobile where there is little room for manipulating any tools. Furthermore, the visor can be swung into operative position or removed from operative position by a mere flick of the hand, likewise without the use of any tools.

With the foregoing and other objects in view, as will hereinafter become apparent, this invention comprises the constructions, combinations, and arrangements of parts, hereinafter set forth, claimed and shown on the accompanying drawing. In this drawing, Figure 1 is a perspective view of the invention, and Figure 2 is a sectional view taken on the line 2—2 of Figure 1.

There is shown at 10 a conventional rear view mirror having its reflecting surface 11 at the back thereof in the usual manner. This mirror 10 is mounted or supported for use in an automobile in any conventional manner, generally by a bracket, which clamps the mirror 10 along the mid-section thereof, such conventional attaching means not being shown on the drawing herewith.

The anti-glare visor of this invention consists of a suitably colored section 12 of glass, celluloid, pyroxyline, or other similar semi-transparent material. This section 12 is gripped along one edge by a bifurcated edge 13 of a hinged body 14 through which extends a pivot bar 15. This pivot bar or pintle 15 extends at one end through an ear 16 formed on one clamp 17 and at the other end through an ear 18 formed on a clamp 19. A nut 20 threaded on the end of the pivoting bar or pintle 15 serves to hold the pivoting bar or pintle 15 and hinged body 14 in assembled position on the ears 16 and 18 of clamps 17 and 19.

The clamps 17 and 19 as will be observed are each formed with flanges 21 and 22 from which ears 16 and 18 extend and which flanges 21 and 22 overlap the front upper edge of the mirror 10. At the other end the clamps 17 and 19 are provided with flanges 23 and 24 which cooperate with the lower front edge of the mirror 10 to hold the clamps 17 and 19 in position thereon. Extending through the tops of the clamps 17 and 19 are the thumb screws 25, which it will be noted are provided with finger wings 26 enabling these screws 25 to be tightened onto the mirror 10 and securely hold the clamps 17 and 19 against accidental shifting thereon. The flanges 23 and 24 as well as 21 and 22 are somewhat gripping, but the presence of the thumb screws 25 insure the firm and secure grip on the mirror 10 and prevents accidental shifting.

In operation, the anti-glare section 12 is left in the lowered position during the night time to prevent the reflection of glaring rays of light of any automobile headlights visible through the rear window of the automobile. This anti-glare section 12 absorbs most of the glaring rays of light before they reach the mirror 10 and what few may penetrate the glass section 12 on the way to the mirror 10 are absorbed and prevented from being reflected from the mirror 10 on their return. In the day time, however, the anti-glare section 12 is pivoted around its pintle 15 to the position 12′ being held in this raised position by friction about the pintle body 15 and by having the pintle 15 clamped by means of the nut 20 between the ears 16 and 18 of clamps 17 and 19.

By varying the pressure of the nut 20 just the right amount of friction will be present to make it easy to move the section 12 in the position 12' or back at any time, yet allow sufficient friction to hold the section 12 in any desired position at any time.

The novel features and the operation of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

Having thus set forth and disclosed the nature of this invention, what is claimed is:

As an article of manufacture, an anti-glare attachment adapted to fit rear view mirrors of varying sizes; said attachment comprising a colored semi-transparent visor screen, a hinge body gripping one edge of said screen, a pintle extending through said hinge body, a pair of one-piece resilient metallic clamps each extending upwardly from the upper front edge of the rear view mirror over the top of the rear view mirror down along the back of the rear view mirror in contact therewith, under the lower edge of the rear view mirror in contact therewith, and upwardly along the front of the rear view mirror a short distance above the lower edge, and terminating in an angularly extending finger, a vertical apertured ear extending forwardly at right angles from the upper front end of each of the said clamps, a winged set screw threaded through each metallic clamp through the portion spaced over the top of the rear view mirror to adjustably fasten the clamp to the mirror, said pintle extending at each end through one of said ears to thereby secure said pintle and hinge body between said ears and pivotally hold said visor screen in front of the mirror, said pintle being threaded at one end and nut means on said threaded end for adjusting the friction to hold said visor screen at any desired angle.

WILLIAM KANGAS.